Patented Nov. 7, 1933

1,934,658

UNITED STATES PATENT OFFICE 1,934,658

CARBOCYANINE DYES AND METHOD OF PREPARING THEM

Leslie G. S. Brooker, Rochester, N. Y., assignor to Eastman Kodak Company, Rochester, N. Y., a corporation of New York No Drawing. Application March 5, 1931
Serial No. 520,460

14 Claims. (Cl. 260—44)

This invention relates to a new composition of matter, and particularly to a new class of photographic sensitizing dyes, and a method for their preparation.

As ordinary photographic emulsions are generally indifferent to those colors of the spectrum of longer wave lengths, various types of sensitizing dyes have been suggested for incorporation in photographic emulsions, or for employing over emulsions as overcoatings so as to increase the spectral sensitiveness thereof. Many cyanine dyes have been described for this purpose containing the benzothiazole nucleus, whilst classes of these photo-sensitizing dyes containing the naphthothiazole nucleus are described in my co-pending applications of Serial No. 337,177, filed February 2, 1929; Nos. 435,104 and 435,105, filed March 12, 1930; and No. 437,017, filed March 19, 1930, whilst those containing the thiazoline nucleus are described in my co-pending application, Serial No. 460,543 filed June 11, 1930 and those containing the thiazole nucleus are described in my co-pending application, Serial No. 548,026 filed June 30, 1931.

An object of the present invention is to provide a process for the preparation of photo-sensitizing dyes of the thiocarbocyanine series containing benzothiazole nuclei, and having substituted alkyl substituents attached to the central carbon atom of the three-carbon chain.

A further object of this invention is to provide such photosensitizing dyes as may be added to photographic emulsions or coated thereon as an overcoating whereby the spectral sensitivity of the photographic emulsion is increased. Other objects will hereinafter appear.

I have found that dyes having good photo-sensitizing properties may be prepared by the treatment of a 1-methylbenzothiazole alkyl quaternary salt with an ortho-ester of a carboxylic acid, the acid corresponding to which contains a substituted alkyl group directly linked to the carbon atom of the carboxyl group. It is not intended to include here substitution of the hydrogen of the alkyl group by a second alkyl group, since that would give rise to a larger radical which would still be an alkyl group and as such is referred to in my co-pending application, Serial No. 540,249 filed of even date herewith. The ortho-esters of the carboxylic acids in this category include such esters as trimethyl ortho-gamma-phenoxybutyrate and trimethyl ortho-phenylacetate. The foregoing reaction may be carried out in boiling dry pyridine.

The reaction of a 1-methylbenzothiazole alkyl quaternary salt with one of these ortho-esters of a carboxylic acid in the presence of pyridine may be written graphically as follows:

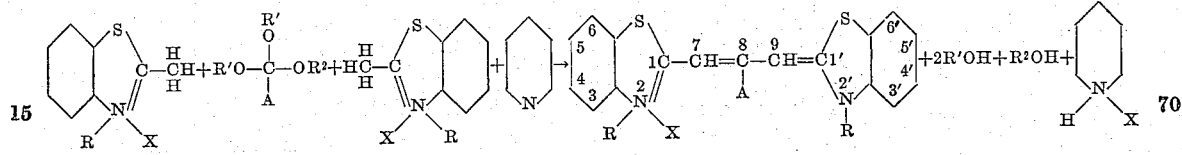

In the above structures R represents an alkyl group and X an acid radical. A stands for the substituted alkyl group to be introduced into the three-carbon chain of the thiocarbocyanine dye and OR' and OR² represent the alkoxy groupings of the orthoester, and these may be similar or dissimilar. The dye molecule is numbered as shown, so that a compound of this type may be described as a 2:2'-dialkyl-8-substituted alkyl-thiocarbocyanine salt.

In actual practice it is frequently desirable to carry out the condensation with an acid radical such as the p-toluenesulfonate, which confers a comparatively high degree of solubility on the 1-methylbenzothiazole alkyl quaternary salt and on the dye. The latter is then conveniently isolated as a less soluble salt by double-decomposition in the ordinary way, such salts as ammonium or potassium bromide or iodide being employed for this purpose, usually in aqueous solution.

The —CH= group is called the methenyl group and therefore the chain —CH=CH—CH= may be called a tri-methenyl chain, and the chain

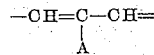

may similarly be called a tri-methenyl chain in which the hydrogen attached to the central carbon atom has been replaced by the group denoted by the letter A.

The nomenclature and numbering of the above classes of compounds and intermediates are in accord with present usage and also the system used in my co-pending applications given above. The numbering, of course, is arbitrary and is given for the guidance of those skilled in the art in order that there be no question as to the identity of a compound covered by my invention.

The methods for the formation of the 1-methyl-benzothiazoles (used in the preparation of the photographic sensitizing dyes herein described) are given in the literature. One general method consists of the conversion of the acetyl compound of an aromatic primary amine, such as p-toluidine, into the thio-acetyl compound, by the action of phosphorous pentasulfide. This thio-acetyl compound is then dissolved in aqueous caustic alkali solution and oxidized with a cold aqueous solution of alkali ferricyanide whereupon the base is produced and may be extracted with ether.

The preparation of some of the ortho-esters of the carboxylic acids, the acids corresponding to which have substituted alkyl groups attached to the carbon atom of the carboxyl group have not, however, been described in the literature and I will give here, therefore, one method for their preparation. These ortho-esters are prepared by taking the nitrile of the corresponding acid as the starting material. The nitrile (one mol.) is dissolved in dry absolute ethyl ether together with an alcohol (1 mol.) such as methyl or ethyl alcohol, all of the reactants being as anhydrous as possible, and dry hydrochloric acid gas (rather more than 1 mol.) is led in, using good cooling throughout the operation. The whole is kept cold and the imino-ether hydrochloride separates and is removed by filtration when crystallization appears to be complete. It is then carefully washed with dry absolute ethyl ether and dried in a vacuum over solid caustic potash until free from all excess of hydrochloric acid. The dry imino-ether hydrochloride is then decomposed at room temperature with an alcohol which again must be as anhydrous as possible, taking roughly 2 to 3 cc. of the alcohol for every gram of the hydrochloride. The latter dissolves more or less completely and the formation of the ortho-ester is accompanied by the separation of ammonium chloride, the formation of which may be used as an indication of the course of the reaction.

The reaction vessel is tightly stoppered and allowed to stand for several days or even several weeks until the reaction is apparently complete. The insoluble material is then filtered off and the excess alcohol is removed by distillation, filtering again if necessary. The ester is finally distilled over, using diminished pressure as a rule, and is purified by the refractionation. Thus benzyl-cyanide or phenylacetonitrile on treatment with methyl alcohol and hydrochloric acid gas in the manner described above yields phenylaceto-imino-methyl-ether hydrochloride, and this, when subjected to the action of methyl alcohol in the manner described, yields trimethyl ortho-phenylacetate. Similarly, γ-phenoxybutyronitrile yields trimethyl ortho-γ-phenoxybutyrate. The ortho-esters of other substituted aliphatic acids may be prepared in a similar manner, whilst mixed esters may be made by taking two different alcohols for the two separate steps of the reaction.

I will now give several examples for preparing various dyes referred to, but it will be understood that they are merely representative of a great number of reactions in which the proportions given and equivalents used may vary in accord with the particular type of dye required. My invention, therefore, will not be restricted thereby except as indicated in the appended claims.

The 1-methylbenzothiazole used in any of the described condensations may be unsubstituted in the benzene nucleus, or it may be substituted therein, as for example by a fused-on benzene nucleus, as described in my co-pending application, Serial No. 435,104.

EXAMPLE 1

2:2'-dimethyl-8-benzylthiocarbocyanine iodide 13.4 g. (1 mol.) 1-methylbenzothiazole metho-p-toluene-sulfonate was refluxed for an hour with 9.5 g. (1 mol.) triethyl ortho-phenylacetate and 25 cc. pyridine. The reaction mixture was then treated with a solution of 20 g. potassium iodide in 75 cc. hot water and dye was filtered off on cooling and washed with water and then with acetone. After drying, a dull brownish-purple powder was obtained weighing 5.53 g. On recrystallization from methyl alcohol the dye formed small purplish-brown needles with a pale-green reflex, which gave a bluish-red solution in the solvent.

EXAMPLE 2

2:2'-diethyl-8-benzylthiocarbocyanine iodide 14 g. (1 mol.) 1-methylbenzothiazole etho-p-toluene-sulfonate was gently refluxed for one hour with 9.5 g. (1 mol.) triethyl ortho-phenylacetate (obtained from phenylacetonitrile) and 15 cc. of dry pyridine. At the end of that time a solution of 20 g. potassium iodide in 75 cc. hot water was added and the dye allowed to crystallize out. When the whole was quite cold it was filtered, and the magnificent green crystals washed with acetone, water, and then acetone again. The clean dried dye weighed 6.02 g. It was recrystallized from methyl alcohol and formed beautiful emerald green prisms. The solution in methyl alcohol was bluish-red.

EXAMPLE 3

2:2':5:5'-tetramethyl-8-benzylthiocarbocyanine bromide 5.0 g. (1 mol.) 1:5-dimethylbenzothiazole was heated over night at 110–130° with 5.7 g. (1 mol.) methyl-p-toluene-sulfonate, and the produce (crude 1:5 dimethylbenzothiazole metho-p-toluene-sulfonate) refluxed for one hour with 7.3 g. (1 mol.) triethyl ortho-phenylacetate and 17 cc. pyridine. At the end of this time the mixture was treated with a solution of 10 g. potassium bromide in 50 cc. hot water, and the bromide of the dye rapidly separated in bright crystals. On cooling, filtering, washing and drying, 2.84 g. of greenish crystals was obtained, and this gave small emerald green crystals on recrystallizing from methyl alcohol, in which solvent the dye gave a bluish red solution.

EXAMPLE 4

2:2'-dimethyl-8-γ-phenoxypropylthiocarbocyanine bromide 6.7 g. (1 mol.) 1-methylbenzothiazole metho-p-toluene-sulfonate was refluxed for about an hour with 4.8 g. (1 mol.) trimethyl ortho-γ-phenoxybutyrate and 18 cc. dry pyridine, and the product was treated with a solution of 10 g. potassium bromide in 45 cc. hot water. When cool, the dye was filtered off, washed with hot water followed by hot acetone and dried, whereupon it weighed 2.59 g. and consisted of a dark purplish crystalline powder. The crude dye was purified by crystallization from methyl alcohol when it formed minute greenish-black crystals and gave a bluish-red solution.

Example 5

2:2'diethyl-8-γ-phenoxypropylthiocarbocyanine iodide 35 g. (1 mol.) 1-methylbenzothiazole etho-p-toluene-sulfonate was refluxed with 24 g. (1 mol.) trimethyl ortho-gamma-phenoxybutyrate (obtained from gamma-phenoxybutyronitrile) and 30 cc. dry pyridine for one hour and a quarter. The dye was then precipitated as the iodide by adding a solution of 40 g. potassium iodide in 100 cc. of hot water. The dye seemed to form a tar and the whole was stirred in a freezing mixture with ether (to remove oily impurities) and the dye slowly crystallized. It was filtered off, washed and boiled with a little acetone, cooled, filtered and dried. 10.6 g. of a dull green powder was obtained which crystallized from methyl alcohol in dark green prisms with a light green metallic reflex, giving a bluish-red solution in the solvent.

By substituting various substituted alkyl groups in the position in the structural formula of the dye occupied by the letter A, and alkyl groups in the two positions occupied by the letter R, many sensitizing dyes may be obtained. The letter X indicates any suitable anion such, for example, as a halide, p-toluene-sulfonate, alkylosulphate, nitrate, acetate, perchlorate, or, in fact, any salt forming anion that will not render the dye too sparingly soluble or deleteriously affect the photographic sensitizing properties of the dye.

It is apparent from a thorough consideration of the above description that any thiocarbocyanine dye prepared from a 1-methylbenzothiazole unsubstituted or substituted, in which the 8 position is substituted by a substituted alkyl group, will come within the scope of this invention whatever may be the radicals occupying the other substitutable positions of the structure. Furthermore, it will also be apparent that the genus claimed hereinafter not only includes the foregoing but also includes any carbocyanine dye containing two of the five membered rings

linked together by a tri-methenyl chain, the hydrogen attached to the central carbon atom of which is substituted by a substituted alkyl group such as, for example, the 8-substituted thiocarbocyanines derived from mu-methylnaphthothiazole described in my application #435,104, the 7-substituted thiazolino-carbocyanines derived from 2-methylthiazoline described in my application #460,548 and the 7-substituted thiazolocarbocyanines derived from 2-methylthiazole described in my application 548,026.

While the principal use now known for these new chemical compounds is for sensitizing photographic emulsions it may well be that other uses therefor will be discovered from time to time and consequently it is not intended that the foregoing description of the sensitizing properties of these dyes shall in any way limit the scope of the claims appended hereto. The combination of the dyes with a photographic emulsion is claimed in my co-pending application Serial No. 505,983, filed December 31, 1930.

What I claim as my invention and desire to be secured by Letters Patent of the United States is:

1. A thiocarbocyanine dye of the following structure

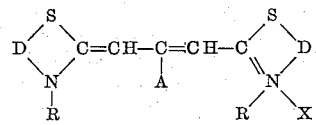

in which D equals a phenylene or a naphthylene group, R equals an alkyl radical, X equals an acid radical and A equals an alkyl group one hydrogen of which has been replaced by an aryl or an aryloxy group of the benzene series.

2. A thiocarbocyanine dye of the following structure

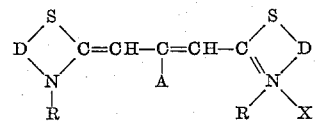

in which D equals a phenylene group, R equals an alkyl radical, X equals an acid radical and A equals an alkyl group one hydrogen of which has been replaced by an aryl or an aryloxy group of the benzene series.

3. A 2:2'-dialkyl thiocarbocyanine halide substituted in the 8-position by an alkyl group, one hydrogen of which has been replaced by an aryl or an aryloxy group of the benzene series.

4. A 2:2'-dimethyl-8-benzyl-thiocarbocyanine salt.

5. A 2:2'-dimethyl-8-gamma-phenoxypropyl-thiocarbocyanine salt.

6. 2:2'-dimethyl-8-benzylthiocarbocyanine iodide.

7. 2:2'-dimethyl-8-gamma-phenoxypropyl-thiocarbocyanine bromide.

8. The process of preparing carbocyanine dyes which comprises condensing, under the influence of heat, one molecular proportion of an ortho-ester of an aliphatic monocarboxylic acid, the acid corresponding to which contains an alkyl group one hydrogen of which has been replaced by an aryl or an aryloxy group of the benzene series, with two molecular proportions of a compound having the structure

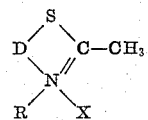

in which D equals a phenylene or naphthylene group, R equals an alkyl radical and X equals an acid radical.

9. The process of preparing carbocyanine dyes which comprises condensing, under the influence of heat, a 1-methylbenzothiazole alkyl quaternary salt with a trialkyl ortho-ester of an aliphatic monobasic carboxylic acid the aliphatic radical of which is substituted by an alkyl group, one hydrogen of which has been replaced by an aryl or an aryloxy group of the benzene series.

10. The process of preparing carbocyanine dyes which comprises condensing, under the influence of heat, a 1-methylbenzothiazole alkyl quaternary salt with triethyl ortho-phenylacetate.

11. The process of preparing carbocyanine dyes which comprises condensing, under the influence of heat, a 1-methylbenzothiazole alkyl quaternary salt with trimethyl ortho-gamma-phenoxybutyrate.

12. The process of preparing carbocyanine dyes which comprises condensing, under the influence of heat, a 1-methylbenzothiazole alkyl-p-toluene-sulfonate with a trialkyl ortho-ester of an aliphatic monobasic carboxylic acid the aliphatic radical of which is substituted by an alkyl group, one hydrogen of which has been replaced by an aryl or an aryloxy group of the benzene series.

13. The process of preparing carbocyanine dyes which comprises condensing, under the influence of heat, a 1-methylbenzothiazole alkyl-p-toluene-sulfonate with triethyl ortho-phenylacetate.

14. The process of preparing carbocyanine dyes which comprises condensing, under the influence of heat, a 1-methylbenzothiazole alkyl-p-toluene-sulfonate with trimethyl ortho-gamma-phenoxybutyrate.

LESLIE G. S. BROOKER.